United States Patent [19]

Yamane et al.

[11] Patent Number: 4,527,892
[45] Date of Patent: Jul. 9, 1985

[54] DISTANCE MEASURING APPARATUS

[75] Inventors: Satoshi Yamane, Kobe; Toshitatsu Suzuki, Takarazuka, both of Japan

[73] Assignee: Ricoh Co., Ltd., Japan

[21] Appl. No.: 446,006

[22] Filed: Dec. 1, 1982

[30] Foreign Application Priority Data

Dec. 1, 1981 [JP] Japan .............................. 56-193046

[51] Int. Cl.³ .................................................. G01C 3/00
[52] U.S. Cl. ......................................... 356/1; 250/201; 354/403
[58] Field of Search ............... 356/1, 4, 141; 354/403; 250/201 AF

[56] References Cited

U.S. PATENT DOCUMENTS 4,445,029  4/1984  Nagaoka .................................. 356/4
4,477,168  10/1984  Hosoe ..................................... 356/1

Primary Examiner—S. C. Buczinski
Assistant Examiner—Gregory C. Issing
Attorney, Agent, or Firm—Guy W. Shoup

[57] ABSTRACT

A distance measuring apparatus for automatically measuring the distance from a reference point to a subject of interest, such as a subject to be photographed, is provided. The present apparatus includes a position sensitive detector, a differential circuit and a pair of detecting/extracting circuits each connected between the detector and the differential circuit, whereby each of the detecting/extracting circuits includes electronic switches which change the mode of operation of the apparatus.

8 Claims, 3 Drawing Figures

DISTANCE MEASURING APPARATUS

BACKGROUND OF THE INVENTION

1. Field of the Invention

This invention relates to a distance measuring apparatus for measuring a distance from its position to a subject of interest and in particular to such a distance measuring apparatus as a range finder for use in a camera and the like.

2. Background of the Invention

As a distance measuring apparatus in an autofocus system of a compact-sized camera and the like, use has been mainly made of a passive type dual image coincidence system utilizing external light. However, in such a passive type dual image coincidence system, in which the distance from its position to a subject of interest is determined when the coincidence in position of two images is obtained, it is required to use a movable mirror for varying the position of one image with respect to the other image. The use of such a movable mirror has been a cause of poor durability of prior art distance measuring apparatus. The dual image coincidence system is strongly dependent upon the condition of a subject of interest since it carries out the measurement of distance on the basis of the contrast information of a subject of interest such as a subject to be photographed. Thus, prior art apparatus have been disadvantageous in low capability of measuring distance for the case in which a subject of interest has a low contrast or for the case in which a subject of interest is in a dark place. Moreover, such a prior art system having a movable part has tended to be complicated in structure, requiring time-consuming adjustments.

Use has also been made of an active type triangulation distance measuring system, according to which, since the light to be used for measurement is emitted from the apparatus itself, the problem of dependency on the conditions of a subject of interest is obviated. However, even in such an active system, if there is provided a movable part such as a pivotal light-emitting or light-receiving section, the above-described disadvantages of poor durability and complicated adjustments cannot be solved.

In view of the above, there has been proposed an improved active type triangulation distance measuring system having no movable parts, as shown in FIG. 1. As shown, there is provided a light-emitting section 1 which emits light such as infrared light, which is then reflected by a subject of interest 2, e.g., 2a, 2b, 2c and 2d. The reflected light then impinges upon a light-receiving section 3 including a plurality of photocells, four cells 3a, 3b, 3c and 3d in the embodiment shown. Then, the distance to the subject 2 may be obtained by determining which of the light-receiving elements has received the reflected light.

In the distance measuring system shown in FIG. 1, the disadvantages of poor durability and complicated adjustments are obviated. However, it suffers from a disadvantage of limited resolution in distance measurement because of the quantized structure of the light-receiving section 3. For example, in the case where the light receiving section 3 is comprised of four light-receiving elements 3a–3d, as shown in FIG. 1, even if the boundary between two adjacent elements is included, the maximum number of levels results in seven and this number may be further reduced when error is taken into account.

Another form of the active type distance measuring system has been the one using ultrasonic waves. In accordance with this ultrasonic system, an ultrasonic wave is radiated toward a subject of interest and the reflected wave from the subject is received by the system, thereby the distance between the system and the subject is determined by the time expended for going and returning trip. In this system, measurement is carried out by a pure electrical processing, which is rather simple; however, a relatively large power supply is required to obtain a high power ultrasonic radiation. Thus, a power supply incorporated in a compact-sized camera would be insufficient in generating an effective ultrasonic radiation. Moreover, in order to prevent the lowering of accuracy in distance measurement from occurring due to reflection from other subjects than the one of interest, directionality of the radiation must be enhanced, which, in turn, requires a larger area for radiating or receiving a ultrasonic wave. This also presents a problem for application to compact-sized cameras.

In view of the foregoing, the present inventors proposed a novel distance measuring apparatus as disclosed in the earlier U.S. patent application, Ser. No. 06/372,817, which has been assigned to the assignee of this application, and the disclosure of which is incorporated herein by reference. In the above-mentioned patent application, there is disclosed a distance measuring apparatus for measuring the distance from a reference point to a subject of interest comprising: means for radiating an energy beam toward the subject of interest; receiving means for receiving the energy beam reflected from the subject, said receiving means including a receiving surface defined between two extreme points and supplying first and second current signals the magnitude of each of which is determined by the location of impingement of said reflected energy beam within and with respect to the two extreme points; first extracting means to which the first current signal is supplied to extract a first fluctuating component from said first current signal thereby eliminating the effect of background light; second extracting means to which the second current signal is supplied to extract a second fluctuating component from the second current signal thereby eliminating the effect of background light; and a differential processing means to which the first and second fluctuating components are supplied to obtain a distance signal by taking a difference between the first and second fluctuating components.

The overall structure of such a distance measuring apparatus is schematically illustrated in FIG. 2b of the above-mentioned application, and the typical structure of the detecting circuit or fluctuating component extracting circuit 9a is shown in FIG. 11 of the above-mentioned application.

However, in that circuit, analog switches $SW_2$ and $SW_3$ are provided and these switches are selectively turned on or off to switch the operating condition between the steady state condition and the light pulse radiation condition thereby producing a detecting signal in response to the irradiated light pulse. When use is made of such analog switches, difficulty usually exists in operating them with appropriate timing. In particular, when the above-described structure is desired to be embodied into an integrated circuit formation, further refinement is required since the resulting circuit tends to be unstable.

SUMMARY OF THE INVENTION

It is therefore a primary object of the present invention to provide an improved distance measuring apparatus.

Another object of the present invention is to provide a distance measuring apparatus which may be easily incorporated into a camera as a rangefinder.

A further object of the present invention is to provide an active-type distance measuring apparatus which is not influenced by the surrounding condition.

A still further object of the present invention is to provide a distance measuring apparatus having a broad range of distance measurement.

A still further object of the present invention is to provide a distance measuring apparatus which is stable in operation and thus accurate in measurement.

A still further object of the present invention is to provide a distance measuring apparatus suitable to be embodied into an integrated circuit structure.

Other objects, advantages and novel features of the present invention will become apparent from the following detailed description of the invention when considered in conjunction with the accompanying drawings.

DESCRIPTION OF THE PREFERRED EMBODIMENT

Figure 1:
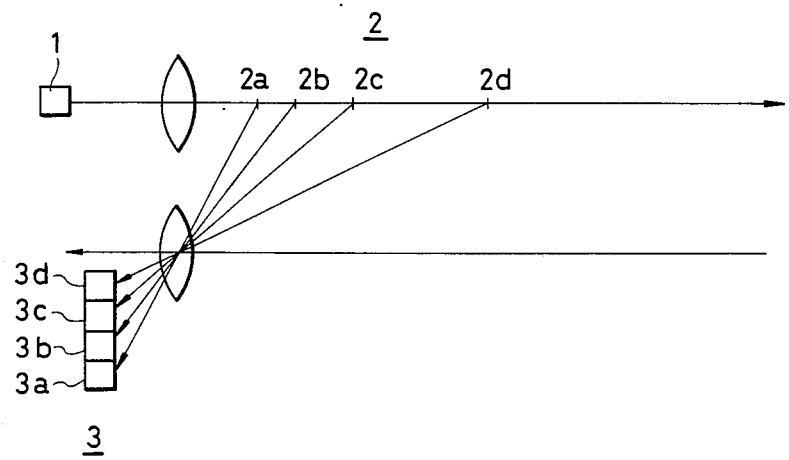
FIG. 1 is a schematic illustration showing the principle of the typical prior art active type distance measuring apparatus.
Figure 2:
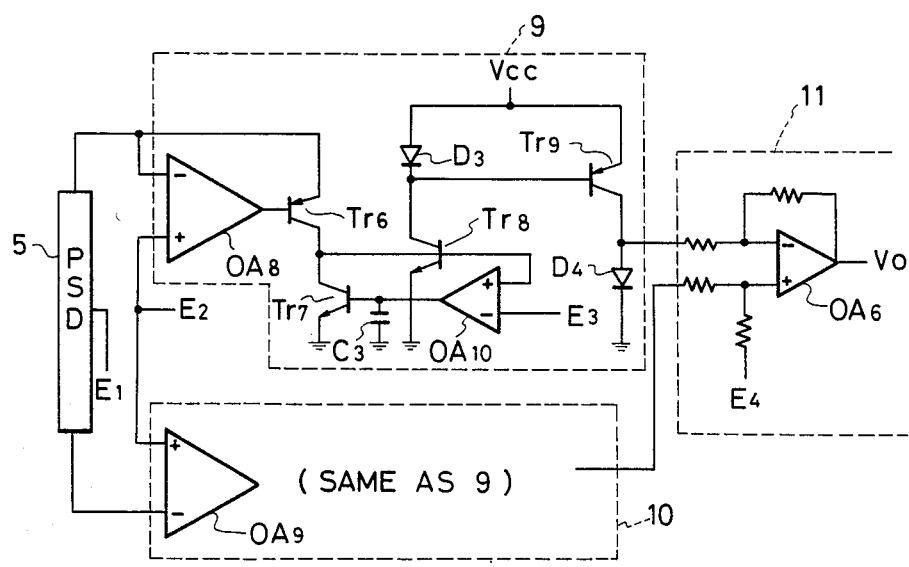
FIG. 2 is a circuit diagram showing one embodiment of the present invention.

Referring now to FIG. 2, there is shown one embodiment of the present distance measuring circuit which includes a position sensitive detector (PSD) 5 which is a planar-type PIN photodiode manufactured by ion implantation technology. As disclosed in detail in the above-mentioned earlier application, the detector 5 has a light receiving surface defined between two extreme points and it supplies a pair of current signals when a spot of light impinges upon the light receiving surface whereby the ratio of these two current signals continuously vary depending upon the location of impingement of the light spot with respect to the two extreme points.

The distance measuring circuit of FIG. 2 further includes a pair of detecting or extracting circuits 9 and 10 which are identical in structure and the first detecting/extracting circuit 9 receives one current output from the detector 5; whereas, the second detecting/extracting circuit 10 receives the other current output from the detector 5. With such a structure, the influence of background light is eliminated and fluctuating components of the signal currents produced only by the light pulses which impinge upon the detector 5 as reflected by a subject of interest are extracted. Also provided in the circuit of FIG. 2 is a differential detecting circuit 11 which is connected to the output of each of the detecting/extracting circuits 9 and 10. Thus, when two fluctuating components are supplied to the differential detecting circuit 11 from the detecting/extracting circuits 9 and 10, a difference between the two fluctuating components is taken and it is supplied as its output, indicating a distance detecting signal corresponding to the ratio of the two current outputs from the detector 5.

As shown in FIG. 2, the detector 5 has two output ends each connected to the inverting input of the corresponding operational amplifier OA8 or OA9. The detector 5 has a reference potential terminal which is connected to a first reference potential E1. Each of the operational amplifiers OA8 and OA9 has its non-inverting input connected to a second reference potential E2. The operational amplifier OA8 has its output connected to the base of a PNP transistor Tr6 whose emitter is connected to the inverting input of the operational amplifier OA8.

The collector of the transistor Tr6 is connected to the collector of an NPN transistor Tr7 whose emitter is connected to ground. A capacitor C3 having a sufficient capacitance is provided as connected between the base and emitter of the transistor Tr7. The junction connecting the collectors of the transistors Tr6 and Tr7 is connected to the base of an NPN transistor Tr8 whose emitter is connected to ground. The base of the transistor Tr8 is connected to the non-inverting input of an operational amplifier OA10 which has its inverting input connected to a third reference potential E3 and its output connected to the base of the transistor Tr7.

The collector of the transistor Tr8 is connected to the cathode of a diode D3 whose anode is connected to a supply voltage $V_{cc}$. The cathode of the diode D3 is connected to a PNP transistor Tr9 which has its emitter connected to the supply voltage $V_{cc}$ and its collector connected to the anode of a diode D4 whose cathode is connected to ground, whereby a well-known current mirror circuit is formed.

The interconnection between the transistor Tr9 and the diode D4 defines the output of the detecting/extracting circuit 9, which is connected to the inverting input of an operational amplifier OA6. Likewise, the output of the other detecting/extracting circuit 10 is connected to the non-inverting input of the operational amplifier OA6, which is also connected to a fourth reference potential E4.

In operation, one of the photo-currents supplied from the detector 5 flows to the transistor Tr7 through the transistor Tr6. At this time, the base potential, or emitter-base voltage $V_{BE1}$ of the transistor Tr7 may be expressed as a function of the photo-current $I_L$ as follows:

$$V_{BE1} = \frac{kt}{q} \ln\left(\frac{I_L}{I_S}\right) \quad (1)$$

where, $I_S$: emitter saturation current of transistor Tr7. Under the condition, since the base of the transistor Tr8 is clamped to the reference potential E3 through the operational amplifier OA10, between the collector and emitter of the transistor Tr8 flows a current $I_B$ expressed by the following equation.

$$I_B = I_S \cdot \exp\left(V_{BE2} \cdot \frac{kt}{q}\right) \quad (2)$$

where,
$I_S$: emitter saturation current of transistor Tr7; and
$V_{BE2}$: base-emitter voltage of transistor Tr8.

Because of this, a mirrored current equivalent to $I_B$ flows to ground through the diode D4, so that the potential $V_{BE2}$ is produced at the junction between the diode D4 and the transistor Tr9. As mentioned previously, since both of the circuits 9 and 10 are structured identically, the reference potential E4 appears as the output $V_o$ from the operational amplifier OA6 of the differential detecting circuit 11 in the steady state condition.

When the fluctuating current component $\Delta I_{L1}$ produced by a light pulse flows through the transistor Tr6, it flows into the base of the transistor Tr8 because the base potential of the transistor Tr7 is clamped by the capacitor C3. Since the transistor Tr8 has a current amplification factor $h_{FE}$, there is produced a collector current of $h_{FE} \cdot \Delta I_{L1}$ in the collector of the transistor Tr8, which then flows to ground through the diode D4. Accordingly, at the junction between the diode D4 and the transistor Tr9 appears the voltage $V_{BE2}$ which corresponds to $h_{FE} \cdot \Delta I_{L1}$.

Figure 3:
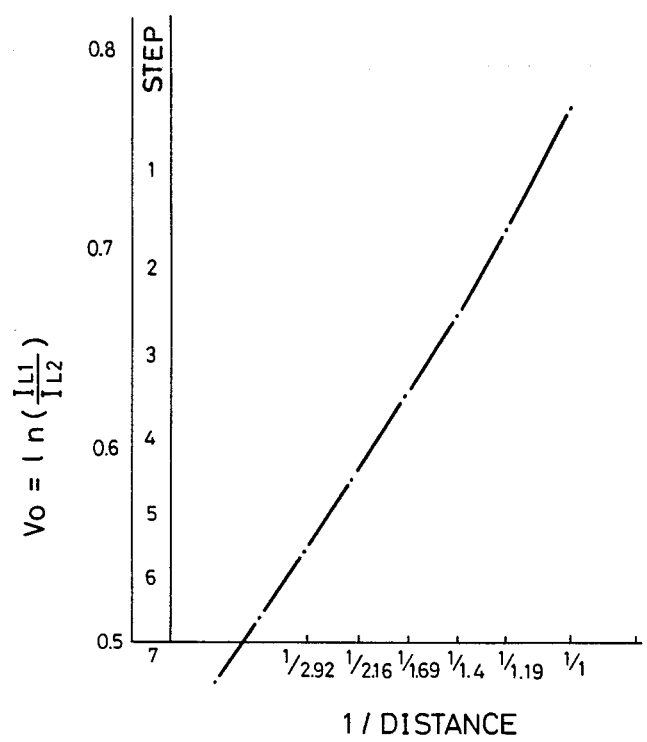
FIG. 3 is a graph useful for understanding the operation of the structure shown in FIG. 2.

The ratio of the photo-currents supplied from both outputs of the detector 5 varies continuously depending upon the location of the light spot received on the light receiving surface of the detector 5 with respect to the two extreme ends of the light receiving surface. FIG. 3 shows the plot of this current ratio $I_{L1}/I_{L2}$ in the graph with its ordinate taken for the logarithm of the current ratio and its abscissa taken for the inverse of the distance to a subject of interest from the distance measuring apparatus.

When a light pulse impinges on the detector 5, the output signal $V_o$ from the operational amplifier OA6 may be expressed as follows:

$$V_o = \frac{kt}{q} \cdot \ln \frac{h_{FE} \cdot \Delta I_{L2}}{I_S} - \frac{kt}{q} \cdot \ln \frac{h_{FE} \cdot \Delta I_{L1}}{I_S} + E4 \quad (3)$$

$$= \frac{kt}{q} \cdot \ln \frac{h_{FE} \cdot \Delta I_{L2}}{h_{FE} \cdot \Delta L_{L1}} + E4$$

As may be understood easily, the above equation (3) can be plotted in the same manner as shown in FIG. 3. Thus, it is clear that the output voltage $V_o$ varies depending upon the distance from the distance measuring apparatus to a subject of interest. Consequently, the distance to a subject of interest may be measured by knowing the value of $V_o$.

While the above provides a full and complete disclosure of the preferred embodiment of the present invention, various modifications, alternate constructions and equivalents may be employed without departing from the true spirit and scope of the invention. For example, the bipolar transistor Tr7 may be substituted by a field effect transistor and the diode D3 forming a part of the current mirror circuit may be substituted by a diode-connected transistor. Therefore, the above description and illustration should not be construed as limiting the scope of the invention, which is defined by the appended claims.

What is claimed is:

1. A distance measuring apparatus for measuring the distance from a reference point to a subject of interest comprising:
   means for radiating an energy beam toward said subject of interest;
   receiving means for receiving the energy beam reflected from said subject, said receiving means including a receiving surface defined between two extreme points and supplying first and second current signals the magnitude of each of which is determined by the location of impingement of said reflected energy beam within and with respect to said two extreme points;
   first extracting means to which said first current signal is supplied to extract a first fluctuating component from said first current signal thereby eliminating the effect of background light;
   second extracting means to which said second current signal is supplied to extract a second fluctuating component from said second current signal thereby eliminating the effect of background light; and
   a differential processing means to which said first and second fluctuating components are supplied to obtain a distance signal by taking a difference between said first and second fluctuating components; thereby each of said first and second extracting means including a first operational amplifier having its first input connected to receive said first or second current signal and its second input connected to receive a first reference potential, a first transistor having its emitter connected to said first input of said first operational amplifier and its base connected to the output of said first operational amplifier, a second transistor having its collector connected to the collector of said first transistor and its emitter connected to a second reference potential, a capacitor connected between the base and emitter of said second transistor, a second operational amplifier having its first input connected to a third reference potential, its second input connected to the junction between the collectors of said first and second transistors and its output connected to the base of said second transistor, a third transistor having its base connected to the junction between the collectors of said first and second transistors and its emitter connected to said second reference potential and a current mirror circuit connected to the collector of said third transistor for supplying said first or second fluctuating component at the output of said first or second extracting means.

2. Apparatus of claim 1 wherein said second reference potential is ground.

3. Apparatus of claim 1 wherein said first input of said first and second operational amplifiers is an inverting input and said second input is a non-inverting input.

4. Apparatus of claim 1 wherein said current mirror circuit includes a first diode having its cathode connected to the collector of said third transistor and its anode connected to receive a predetermined voltage, a fourth transistor having its emitter connected to receive said predetermined voltage and its base connected to the cathode of said first diode and a second diode having its anode connected to the collector of said fourth transistor and its cathode connected to ground whereby said first or second fluctuating component is taken from the junction between the collector of said fourth transistor and the anode of said second diode.

5. A distance measuring apparatus for measuring the distance from a reference point to a subject of interest comprising:
   means for radiating an energy beam toward said subject of interest;
   receiving means for receiving the energy beam reflected from said subject, said receiving means including a receiving surface defined between two extreme points and supplying first and second current signals the magnitude of each of which is determined by the location of impingement of said reflected energy beam within and with respect to said two extreme points;

first extracting means to which said first current signal is supplied to extract a first fluctuating component from said first current signal thereby eliminating the effect of background light;

second extracting means to which said second current signal is supplied to extract a second fluctuating component from said second current signal thereby eliminating the effect of background light; and a differential processing means to which said first and second fluctuating components are supplied to obtain a distance signal by taking a difference between said first and second fluctuating components; thereby each of said first and second extracting means including a first operational amplifier having its first input connected to receive said first or second current signal and its second input connected to receive a first reference potential, a first transistor having its emitter connected to said first input of said first operational amplifier and its base connected to the output of said first operational amplifier, a second transistor having its drain connected to the collector of said first transistor and its source connected to a second reference potential, a capacitor connected between the gate and source of said second transistor, a second operational amplifier having its first input connected to a third reference potential, its second input connected to the junction between the collector of said first transistor and the drain of said second transistor and its output connected to the gate of said second transistor, a third transistor having its base connected to said junction and its emitter connected to said second reference potential and a current mirror circuit connected to the collector of said third transistor for supplying said first or second fluctuating component at the output of said first or second extracting means.

6. Apparatus of claim 5 wherein said second reference potential is ground.

7. Apparatus of claim 5 wherein said first input of said first and second operational amplifiers is an inverting input and said second input is a non-inverting input.

8. Apparatus of claim 5 wherein said current mirror circuit includes a first diode having its cathode connected to the collector of said third transistor and its anode connected to receive a predetermined voltage, a fourth transistor having its emitter connected to receive said predetermined voltage and its base connected to the cathode of said first diode and a second diode having its anode connected to the collector of said fourth transistor and its cathode connected to ground whereby said first or second fluctuating component is taken from the junction between the collector of said fourth transistor and the anode of said second diode.

* * * * *